United States Patent
Carter et al.

(10) Patent No.: US 10,552,425 B1
(45) Date of Patent: Feb. 4, 2020

(54) SYSTEM AND METHOD FOR AUTOMATED DATA UTILIZATION

(71) Applicant: JPMorgan Chase Bank, N.A., New York, NY (US)

(72) Inventors: Robert Carter, Lithia, FL (US); Jarek R. Whiteside, Tampa, FL (US); Matthew Kenneth Chiogioji, Tampa, FL (US); Trevor Smith, Tampa, FL (US); Guillermo Chu, Brandon, FL (US); Christelle Joseph, Temple Terrace, FL (US); Crystal A. Wyatt, Riverview, FL (US); Pankaj Gupta, Tampa, FL (US)

(73) Assignee: JPMorgan Chase Bank, N.A., New York, NY (US)

(*) Notice: Subject to any disclaimer, the term of this patent is extended or adjusted under 35 U.S.C. 154(b) by 416 days.

(21) Appl. No.: 15/141,234

(22) Filed: Apr. 28, 2016

(51) Int. Cl.
| | | |
|---|---|---|
| *G06F 17/30* | (2006.01) | |
| *G06F 7/00* | (2006.01) | |
| *G06F 16/2457* | (2019.01) | |
| *G06F 16/93* | (2019.01) | |
| *G06F 16/248* | (2019.01) | |

(52) U.S. Cl.
CPC ...... *G06F 16/24575* (2019.01); *G06F 16/248* (2019.01); *G06F 16/93* (2019.01)

(58) Field of Classification Search
CPC ......... G06F 17/30528; G06F 17/30011; G06F 17/30554; G06F 16/248; G06F 16/93; G06F 16/24575

USPC ........................................................ 707/722
See application file for complete search history.

(56) References Cited

U.S. PATENT DOCUMENTS

| | | | | |
|---|---|---|---|---|
| 8,468,446 | B2* | 6/2013 | Molenaar | G06F 16/84 715/234 |
| 2006/0159109 | A1* | 7/2006 | Lamkin | G11B 27/10 370/401 |
| 2009/0327343 | A1* | 12/2009 | McCormack | G06F 16/258 |
| 2013/0332315 | A1* | 12/2013 | Genesereth | G06Q 30/0641 705/26.61 |
| 2015/0269201 | A1* | 9/2015 | Caso | G06F 16/188 707/641 |
| 2015/0317296 | A1* | 11/2015 | Vohra | G06F 17/243 715/221 |

* cited by examiner

*Primary Examiner* — Kuen S Lu
(74) *Attorney, Agent, or Firm* — Hunton Andrews Kurth LLP

(57) ABSTRACT

The invention relates to a computer-implemented system and method for automatically utilizing data from a document. The method may comprise the steps of: receiving a document; automatically scanning the document to identify at least one data field in the document; proposing a document definition to a user based on the scan; receiving an acceptance or modification of the document definition from the user through the user interface; automatically extracting at least one data element and at least one data field from the document using the document definition; automatically searching an existing database for at least one data element or data field that matches the data element or data field extracted from the document; and storing a link between at least one of the extracted data element or data field and a data element or data field in the existing database.

18 Claims, 4 Drawing Sheets

SYSTEM AND METHOD FOR AUTOMATED DATA UTILIZATION

FIELD OF THE INVENTION

The present invention relates generally to data utilization, and more particularly to a method and system for automatic identification, extraction, and correlation of data received in variable formats from a variety of sources.

BACKGROUND

Companies and other organizations rely on data feeds from numerous sources to obtain relevant, timely data for their businesses and operations. Such data sources, however, are commonly received in a variety of formats which requires the receiving organization to manually extract the relevant data from each type of document. Consequently, many organizations expend considerable resources to analyze incoming data and file formats, identify relevant data, and store it in a useful format in their existing databases. The extent of effort involved may consume a large amount of the organization's administrative resources. In addition, many organizations do not effectively correlate incoming data with their existing databases. Consequently, organizations frequently miss opportunities to effectively and rapidly assimilate incoming data into their operations and businesses. These and other drawbacks exist with known systems.

SUMMARY

According to one embodiment, the invention relates to a computer-implemented system and method for automatically utilizing data from a document or file received from a third party source. The method may be conducted on a specially programmed computer system comprising one or more computer processors, electronic storage devices, and networks. The method may comprise the steps of: receiving a document in electronic format; automatically scanning the document to identify at least one data field in the document, wherein the at least one data field includes at least one data element; proposing a document definition to a user through a user interface based on the scan, wherein the document definition defines a type of document and at least one data field; receiving an acceptance or modification of the document definition from the user through the user interface; automatically extracting at least one data element and at least one data field from the document using the document definition; automatically searching an existing database for at least one data element or data field that matches the data element or data field extracted from the document; storing a link between at least one of the extracted data element or data field and a data element or data field in the existing database; storing the at least one extracted data element in the database; and generating a report containing at least one extracted data element and at least one existing data element.

The invention also relates to a computer implemented system for automatically utilizing data from a document, and to a computer readable medium containing program instructions for executing a method for automatically utilizing data from a document.

The computer implemented system, method and medium described herein can provide the advantages of significantly enhancing the efficiency with which an organization can extract useful information from a variety of data sources, store such extracted data in a database, and correlate such extracted data with existing information on its customers or clients, thereby allowing the organization to efficiently create reports that provide a comprehensive depiction of the customer or client. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
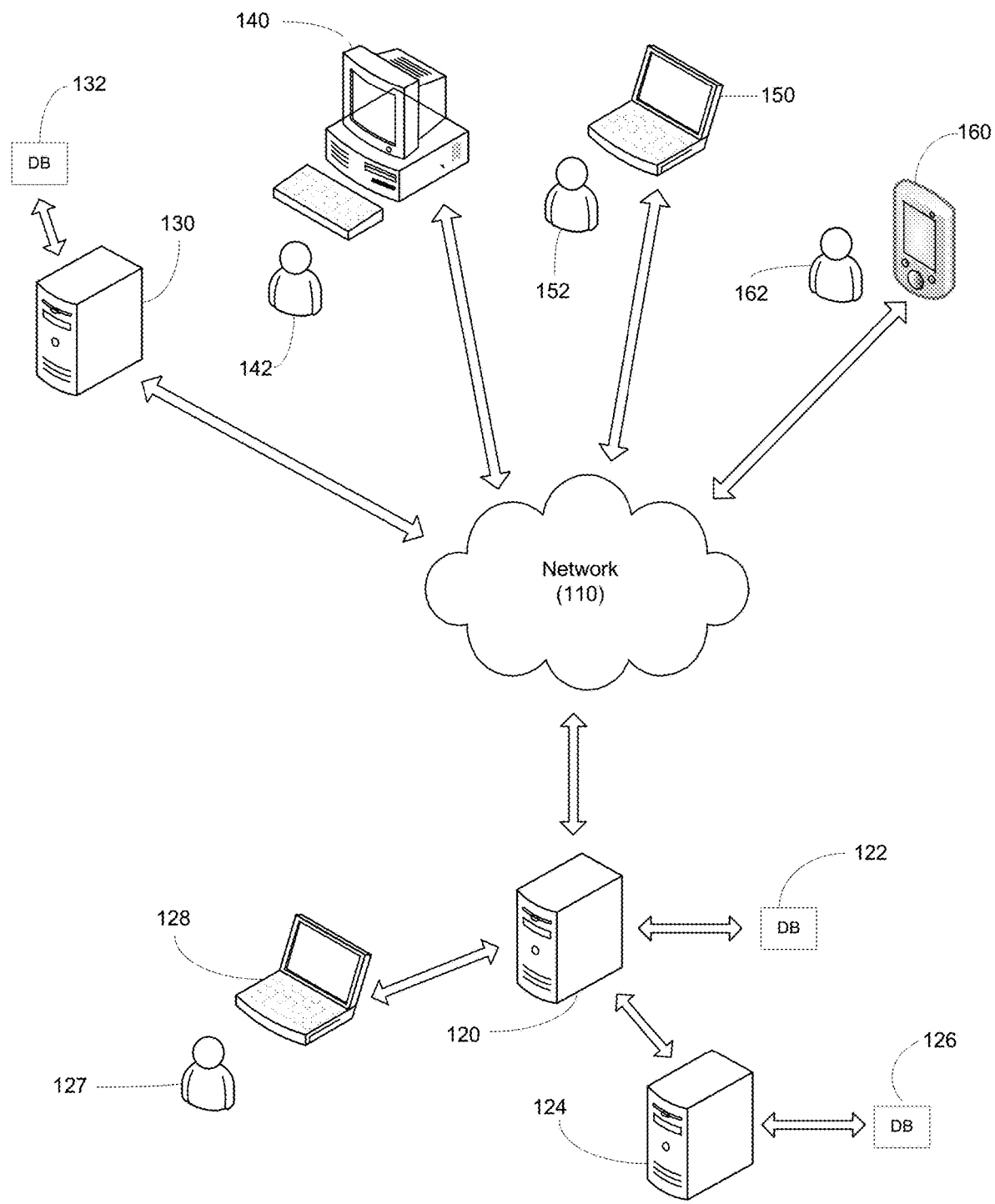
FIG. 1 is a diagram of a system for automatically utilizing data from a variety of data sources according to one embodiment of the invention.

FIG. 1 is a diagram of a system for data utilization according to an exemplary embodiment of the invention. As shown in FIG. 1, the system may include a network and one or more computing devices, such as servers, desktop computers, laptop computers, tablet computers, and other mobile computing devices. The system may be operated by a business or entity that receives data from different sources in a variety of formats. According to one example, the system is operated and maintained by an educational institution utilizing data relating to its students received from a variety of sources. For simplicity, the examples set forth herein will be described in terms of a system operated by an educational institution. However, those skilled in the art will appreciate that other types of organizations, such as companies or businesses, can operate and maintain the system for the benefit of their respective customers or clients.

Referring again to FIG. 1, the system may be embodied primarily in a web application server 120, which may include a database server 122, owned and/or operated by the educational institution that may interface with one or more other servers and entities via one or more networks. The network 110 shown in FIG. 1 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example. The web application server 120 and database server 122 that are used by the educational institution can facilitate the identification, extraction, correlation, and other utilization of data from various reports, documents, files, or other sources for the benefit of itself and its students.

The web application server 120 may be operated by an analyst, instructor, or case worker 127 using a computing device such as a laptop computer 128. The web application server 120 accepts and processes the incoming data and the database server 122 stores the mapping, metadata, and consumed data, according to an exemplary embodiment of the invention. The web application server 120 can interface with other servers owned and/or operated by the educational institution, if desired. For example the web application server 120 may interface with another server 124 and associated database 126 that stores and processes other data of the educational institution. The foregoing description is merely one example of a configuration for such systems and functions and is not intended to be limiting.

Also shown in FIG. 1 are a number of other computing devices such as servers, desktop computers, laptop computers, and mobile computers that may transmit data in various formats to the web application server 120 via the network 110 according to one embodiment of the invention. For example, various data sets may be transmitted automatically or manually by a third party server 130 and associated database 132, a desktop computer 140 operated by an operator 142, a laptop computer 150 operated by an operator 152, and/or a tablet computer or smartphone 160 operated by an operator 162.

The transmitted data may exist in various formats, such as text files, comma separated value (CSV) files, Microsoft Word files, spreadsheet files such as Microsoft Excel, presentations such as Microsoft PowerPoint, government forms, other forms, scanned files (e.g., pdf format), XML files, HTML files, TXT files, JSON files, webservice requests, etc. The files are sent via the network 110 to the web application server 120 and can be sent by various processes, such as transmission to a designated email address, FTP site, or other uploading process. The files arrive from different sources and have dissimilar data and layouts. The word "document," as used herein, generally refers to the document, file or other data source received by the system, from which data is extracted.

According to one example, the organization that operates the system runs a financial educational program for individuals to provide training in personal finance management. The educational program involves providing instruction and testing on concepts in personal finance management, including analysis of bank statements, pay statements, loan statements, and educational test results. An instructor or case worker analyzes the student's bank statements, pay statements, loan statements, and test results to assess the student's progress and level of understanding and follows up with the student to provide additional instruction, guidance, and advice. The educational program involves receipt of a number of documents or files from different data sources. For example, the case worker may receive bank statements from the student's bank, loan statements from a lender, pay statements from the student's employer, and test results from tests administered by the educational institution, each of which is transmitted in a different format. To assist and instruct the student, the case worker may compile all the data into a useable format, such as a comprehensive report. Based on the variety of data formats for the incoming data, the compilation and report generation may be greatly facilitated by utilizing an embodiment of the present invention.

Figure 2:
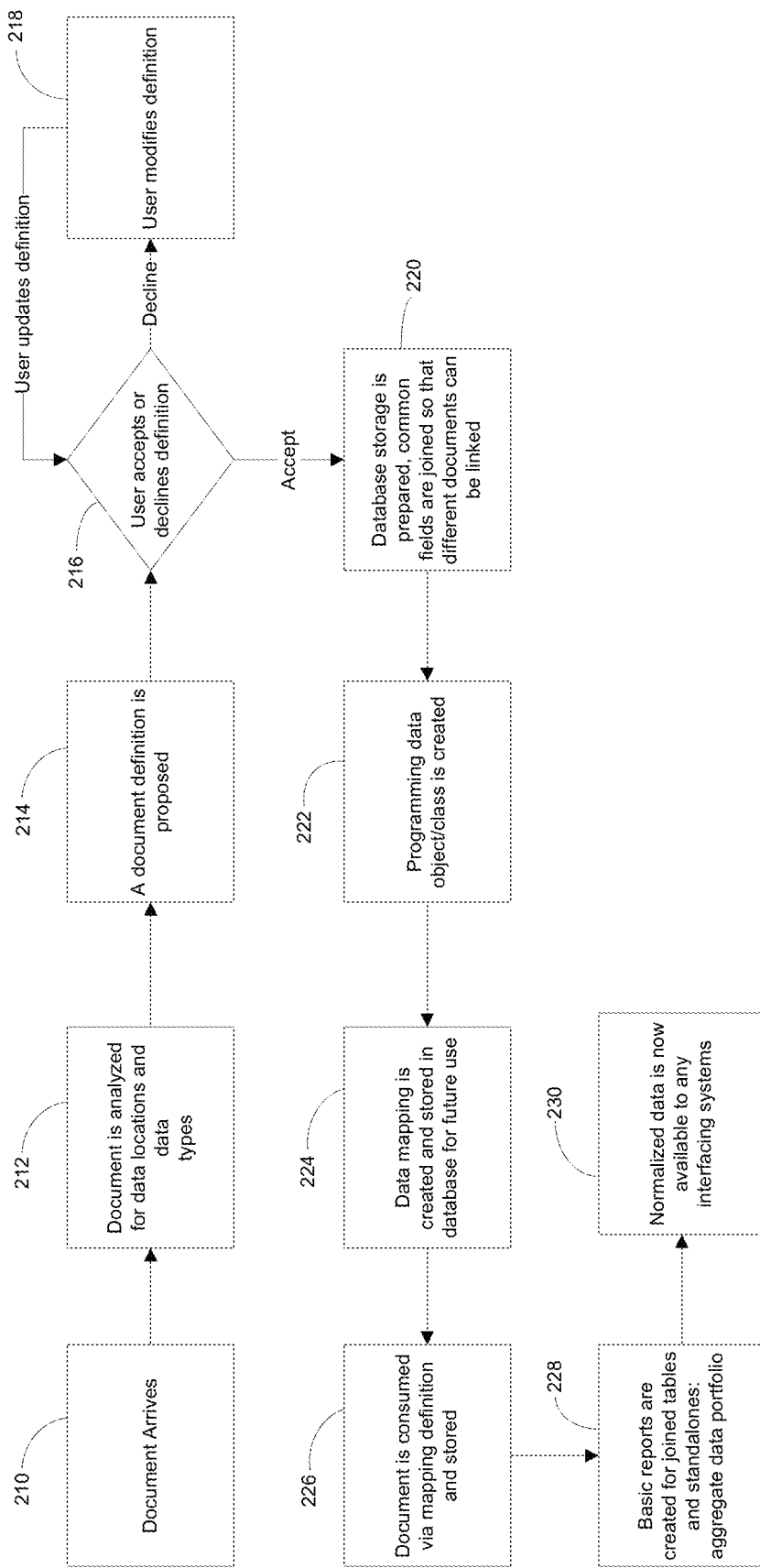
FIG. 2 illustrates an example of a method for identifying, parsing, and correlating incoming data from various sources and formats.

Referring now to FIG. 2, a process for automatically utilizing data extracted from documents or files in varying formats will be described according to one embodiment of the invention.

In step 210, the document is received by the web application server 120. Typically, the document is received in electronic format, but it may also be received as a hard copy and electronically scanned by the user.

In step 212, the web application server 120 analyzes the electronic document for data fields and their locations. For example, the web application server 120 may include a software program to automatically analyze the file type by its attributes such as file extension (e.g., .txt, .docx, .csv, .xlsx, .ppt, .xml, .html, .pdf, etc.). The software program may also include functionality to scan the file for the purpose of identifying data fields and their locations in the file. The data locations may be defined by a physical region on a document, or by delimiting characters, for example. The software program may include functionality to scan and read the data in the file in order to identify relevant characteristics, such as the source of the file and locations of certain data fields. The document or file can be analyzed by using identifying characteristics present in data files. Examples of such identifying characteristics include header titles for each column in a Microsoft Excel sheet or column headers in a fixed length text file, such as in a banking statement, student transcript or purchase invoice, for example.

The application executed by the web application server 120 can automate the identification of the data "payload" (e.g., the data needed from the file) by determining that the header detail ends at a specified point and some or all of the data layout thereafter is repetitive in nature (e.g., purchase debits, refund credits, student grades, etc.). This specified point in many documents is indicated by an underscore under column headings of the first line in an Excel table, according to some embodiments of the invention. As used herein, "data field" generally refers to a region of the document in which one or more data elements (the data payload) is located. The data field may have a label or title and the region may be defined by a physical area on the document or by a delimiter, for example.

Additionally, the software application is programmed to store a document definition including mapping information for each document (e.g., the locations of various data elements and/or data fields in the document) and a central repository of document definitions including mappings is stored and may be automatically referenced to determine if the document definition already exists for the type of document in question according to a preferred embodiment of the invention. An advantageous feature of this logic is that the determination of data location can be reviewed by the user for correctness. In the event that the data payload is not in the location as mentioned above, then the mapping can be created or modified manually by the end user by "drawing" a box around the locations on a graphical representation of the document (presented visually to the end user through a graphical user interface) using a mouse or other pointer, for example. The areas marked can be defined by the user to promote proper formatting. For example, the user can draw a box (such as with a drag tool) around a phone number, and the software application identifies that the object is a phone number based on known data element types and suggests that to the end user. In the event that the data element is new, the user can define how the element should be displayed and consumed (e.g. data type, numeric or alphabetical, language, etc.) using the graphical user interface.

The software application that provides this file loading functionality can be considered to be recursive in nature because the process it carries out breaks down incoming files into individual data elements and treats each file as a collection of data elements instead of addressing the incoming file holistically. Once the data is mapped and stored, future files and data elements are checked against existing, stored document definitions including mappings, as mentioned above.

The analysis conducted in step 212 produces a set of defining characteristics for the incoming document that can be used to compare the document to a document definition. A document definition is a set of defining characteristics for a known type of document. The defining characteristics may include, for example, the file type (e.g., .txt, .docx, .csv, .xlsx, .ppt, .xml, .html, .pdf, etc.), the source of the file, the physical layout of the file, including defined regions or data fields where relevant data resides, and other delimiters of relevant data in the file, such as row and column designations, commas or other characters used for separation of values, symbols, tags, or other delimiters.

In step 214, the set of defining characteristics resulting from step 212 are compared to the existing document definitions that have been previously saved in the system 120, 122. For example, the system 120, 122 may include document definitions for different types of documents, such as account statements transmitted by various banks, credit reports sent by different credit bureaus, government forms sent by government agencies, such as tax forms, pay statements transmitted by different employers, loan statements transmitted by different lenders, and test results from the educational institution. The software program compares the defining characteristics of the incoming document to the defining characteristics of existing document definitions and identifies the document definition that most closely matches the defining characteristics of the incoming document. The software program then proposes the chosen document definition to the user 127 of the system 120 in step 214 by displaying it on the user's computing device 128. For example, the software program may be programmed to present to the user an image of a proposed document and a name of the proposed document (e.g., monthly pay statement from ACME Co.).

In step 216, the user accepts or declines the proposed document definition. For example, the system may indicate that the incoming document is a monthly automobile loan statement from SmallBank. The user 127 reviews the proposed document definition and the incoming file, compares the two, and accepts or declines the document definition, e.g., by clicking on an "accept" or "decline" button. To allow the user to make this decision, the system can identify the proposed document definition for the user and also display the incoming document to the user, thus allowing the user to compare the two.

In step 218, if the user 127 has declined the document definition proposed by the system 120, the user is provided an opportunity, through a user interface, to modify the document definition to create a new definition that is specific to the incoming document. For example, the system may present the user with a form or other interface that allows the user to input the defining characteristics of the incoming file, such as the file type (e.g., .txt, .docx, .csv, .xlsx, .ppt, .xml, .html, .pdf, etc.), the source of the file (e.g., SmallBank), the name of the file, the physical layout of the file, including defined regions (data fields) where relevant data resides, other delimiters of relevant data in the file, such as row and column designations, commas or other characters used for separation of values, symbols, tags, or other delimiters, and a name for each type of data to be extracted (e.g., name, account number, balance, date, etc.). The system then allows the user to create a new or modified document definition and name it accordingly, e.g., "SmallBank Auto Loan Statement." Once the user has completed and saved the new document definition, flow returns to step 216 and the user can then accept the newly created document definition, e.g., by clicking on an "accept" button.

In step 220, the system allocates storage in the database 122 for the data extracted from the incoming document. This storage allocation process may entail the creation of new tables to be stored in the database 122 in the event that a new document definition has been created. If an existing document definition has been selected, then the allocation of storage space may entail creation of a new row or column in one or more existing tables to store the new data extracted from the incoming document.

Step 220 may also involve the joining or linking of common data fields or data elements so that different documents or reports can be linked. For example, the incoming data file may include fields containing certain identifying information such as the name of an individual, names of family members, company name, account number, social security number, phone number, email address, or other reference number, identification number, or identifier. One or more of these data fields or data elements may be linked to or correlated with corresponding data fields or data elements in tables within the existing database 122. For example, the account holder's name in the data field of an incoming automobile loan statement may be linked to a corresponding data field containing that individual's name in a table already existing in the database 122. Similar linking may be performed on other data fields, such as account numbers or other reference numbers. In this way, the data fields and/or data elements from the incoming document can be correlated with data that already exists in the database 122 for that individual or account.

The system may include software to automatically compare identifiers, such as column names, row names, or other labels, and/or values, such as names, identification numbers, or other reference names or numbers, to identify potential matches between the incoming data elements and data fields and the data elements and data fields stored in existing tables in the database 122. This functionality can uncover additional correlations or matches between data fields and/or data elements, e.g., in tables, columns, rows, and/or cells, that were not previously known to the user 127, for example. The software may include functionality to identify potential matches and query the user 127 as to whether the user wishes to define a correlation or link between data fields and data elements in tables, columns, rows, and/or cells. For example, when a new file is received, the system may present the user with all potential matches between the data fields and data elements in the new file, and data fields and data elements in the existing database 122. The system can then automatically record those matches or allow the user to specify which matches or correlations to record and save.

Figure 3:
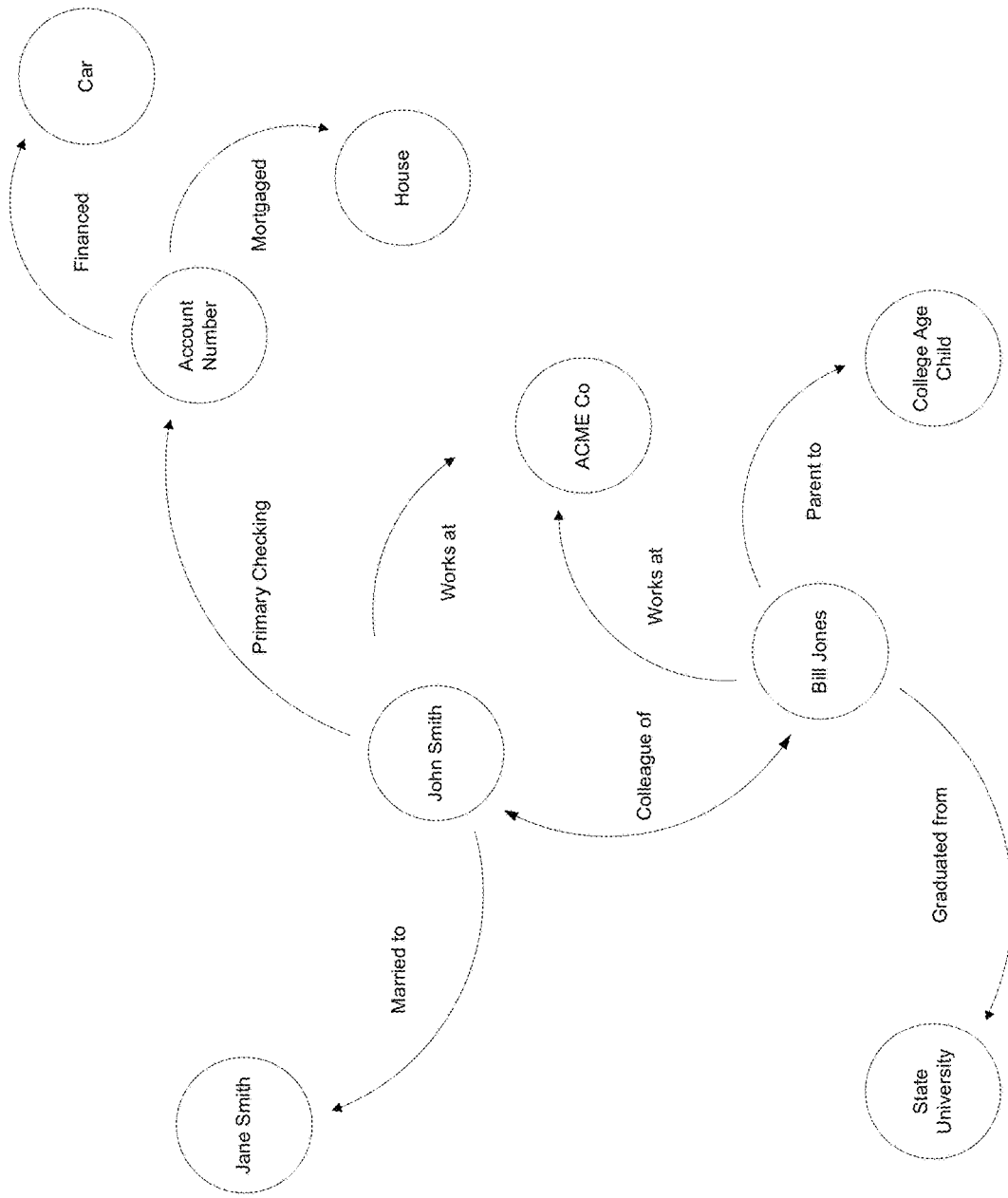
FIG. 3 depicts an example of correlations and relationships between different types of incoming and stored data according to an exemplary embodiment of the invention.

FIG. 3 illustrates an example of correlations or links between different data types. As shown in FIG. 3, related data from different sources can provide a broader and more comprehensive characterization of an individual when various data elements and/or data fields are linked or correlated. The example in FIG. 3 depicts a number of data fields that are directly or indirectly related to an individual, John Smith, including the account number for his car loan, the account number for his mortgage, the name of his wife, his employer, ACME Co., and his co-worker at ACME Co., Bill Jones. Similarly, Bill Jones is linked to ACME Co., is identified as a colleague of John Smith, and is linked to related information identifying his adult child and alma mater. In the foregoing example, additional data on John Smith may be received by the system 120 in the form of a monthly auto loan statement, a checking account balance, and/or a pay statement, for example, which data may be correlated with other data on John Smith by linking the John Smith field in the incoming data with the corresponding field in the existing database 122.

The recursive nature of the process described above can provide the advantage of identifying connections that were previously not known to the user 127. For example, if this process is used on credit card tracking, the software application may identify that certain customers regularly purchase McDonalds breakfast on Sundays. This information can then be used by the credit card issuer to decide to pursue McDonalds co-branding to further strengthen the association for the card user. In the example of educational institutions, the correlation between grades and classes can be further evaluated. For example, a university might identify that a certain professor of a class had a high number of failures and could associate that the class was being retaken by students with another professor. This functionality allows for the discovery and tracking of associations between different data elements previously unknown to the user. This functionality can provide a significant advantage to the organization. Unlike in conventional database structures where associations have to be known by the analyzer in order for the data to be consumed, according to exemplary embodiments of the invention the software can automatically identify previously unknown data relationships using the processes described herein. By leveraging relationships and graph database functionality shown in the drawings, data relationships can be defined during the initial mapping of the data source and by browsing common relationships data becomes more meaningful as previously unknown correlations are revealed (e.g. many ACME co. employees drive BMWs).

Referring again to FIG. 2, after the common fields are joined or linked, a programming data object can be created. The object can be a table, for example, that includes one or more rows or columns each defining a data field. The data object can be used to define and store different data from the received document. In the example of a received automobile loan statement, the table may include a row or column for each of the following data fields: account holder's name, account number, outstanding balance, current amount due, due date, amount applied to principal, and amount applied to interest. The programming object allows for this subset of data to be worked with in a programmatic way allowing for better ease of use for data mining.

In step 224, one or more of the foregoing rows or columns may be linked to corresponding rows or columns in existing tables in the database 122. This data mapping is created and stored in the database 122 for future use. The user may specify a one-to-one relationship, a one-to-many relationship, or a many-to-many relationship between and among rows and columns in different tables in the database 122, for example.

Once the data mapping is created and stored in the database 122, the document can be consumed by the mapping definition, and the relevant data can be stored in the database 122. The document definition allows the system 120 to extract the applicable data from the incoming document, the mapping enables the system 120 to store that data in the correct table locations in the database 122, and the correlations link that data with a broader array of data stored in the database 122 that is directly and/or indirectly related to the customer, client or student, for example.

In step 228, the system can create reports for standalone tables or joined tables. A report for a standalone table would present the data in that standalone table for the user in a desired format to enable the user to easily understand the data. The report for joined tables would include data from two or more tables stored in the database 122 that had been logically linked with data fields. Such a report would provide a more comprehensive depiction of the customer, client or student, because it is based on historical data not simply data from one received document.

The reports can be designed and customized for any desired purposes. For example, referring again to the example of an educational program for personal finance management, a report can be designed for a case worker who is teaching or assisting a student. The report can pull data from the database 122 that has been stored in one or more tables. The report can be customized to include relevant data from a number of different sources, such as the student's name, student ID number, checking account number, checking account balance, transaction history, automobile loan account number, payment history for auto loan, outstanding loan balance, courses, test results, employer, pay statements, and tax information. The report can be designed and generated easily because the data has been stored and correlated in the database 122. The joining of tables enables a more comprehensive report to be generated that draws from different data sources.

As shown in step 230, normalized data can be made available to any interfacing system or systems. For example, the administrator of the database 122 may create an application programming interface (API) or other interface that allows certain authorized users to access certain data stored in the database 122. The API may contain definitions, protocols, and software code that facilitate access to various data fields by defining the content of the data fields and the process and code for accessing them.

Figure 4:
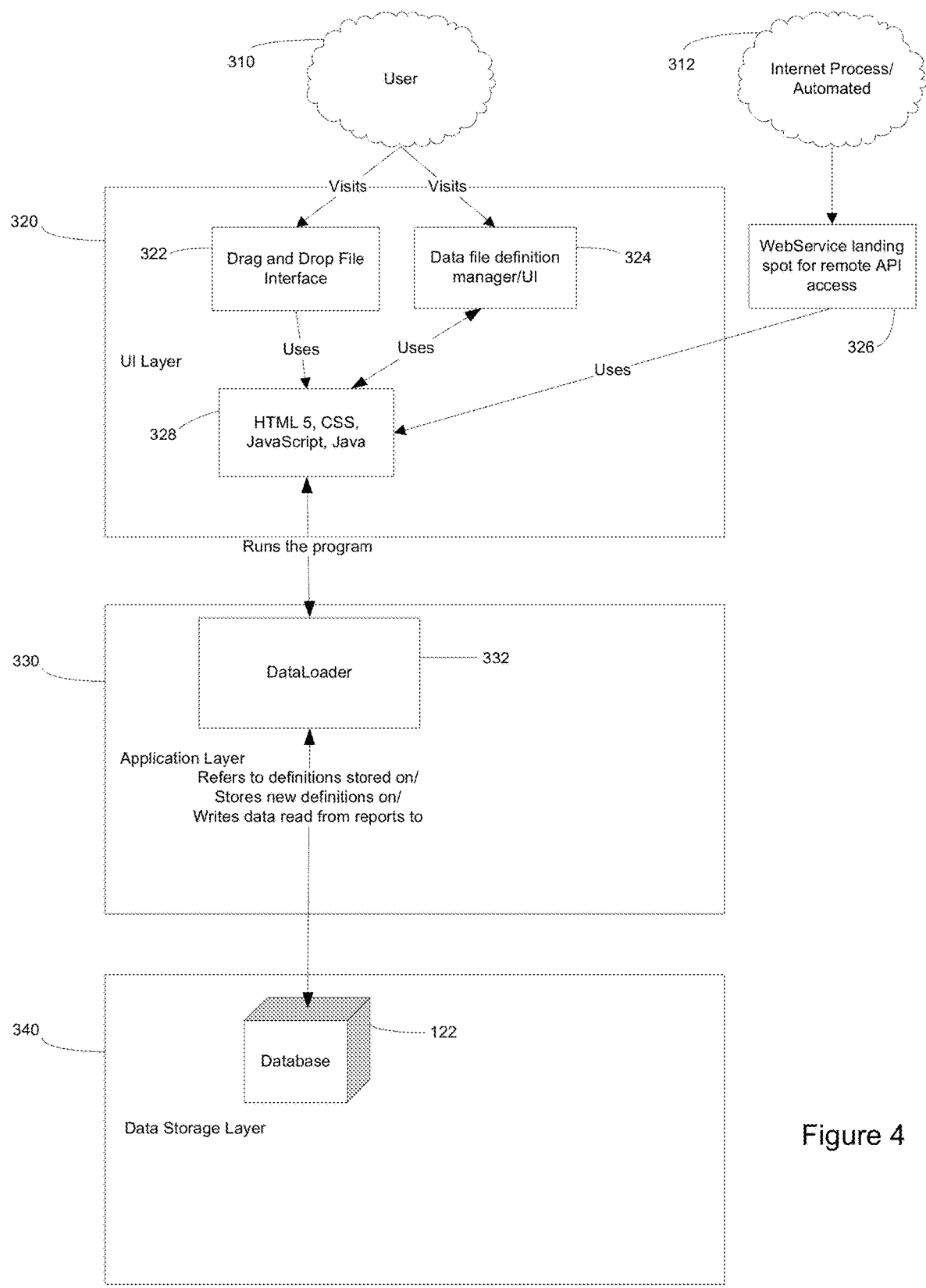
FIG. 4 illustrates an example of the software or functional layers of the system according to an exemplary embodiment of the invention.

FIG. 4 is a system diagram illustrating layers of the system according to an exemplary embodiment of the invention. As shown in FIG. 4, the system includes a user interface ("UI") layer 320, an application layer 330, and a data storage layer 340. According to one embodiment, the UI layer 320 and application layer 330 comprise software and data residing on the web application server 120 shown in FIG. 1, and the data storage layer 340 comprises software and data residing in the database 122 shown in FIG. 1.

The UI layer 320 may include a drag and drop interface module 322 that a user 310 can use to drag and drop an incoming file into a folder designated for the applicable document definition. The user 310 may be the user 127 shown in FIG. 1, or may be a different user that accesses the system 120 remotely through the internet, for example. The drag and drop interface module 322 enables the user 310 to match the incoming document with the appropriate document definition if known to the user. For example, if the user knows that the file is a monthly checking account statement from SmallBank, the user can drag and drop the file into the folder designated for that document definition.

The UI layer 320 also includes a data file definition manager 324. The definition manager 324 enables the user 310 to create, modify, and delete document definitions for the incoming data files, as described above with reference to step 218 in FIG. 2. The definition manager 324 may include a user interface that allows a user to specify the defining characteristics of any type of incoming document or data file, such as by specifying the file type, the data fields it contains, the locations of the data fields as defined by a physical location or by a specified delimiter, and the source of the file. The document definitions can then be reused in the future for any incoming data file of the same type, e.g., for all checking account statements transmitted by SmallBank, or all pay statements issued by a certain employer.

FIG. 4 also depicts a webservice landing spot module 326 which can provide remote API access to the system 120. This webservice landing spot module 326 serves as an interface for automatically receiving different documents and file types through an API from automated transmissions by various data sources 312, such as the server 130 in FIG. 1. The API defines the protocols for transmitting various files to the webservice landing spot module 326.

Block 328 in FIG. 4 depicts a processing module that provides automated and/or programmatic ways to search, display, and manipulate the data as described herein. The processing module 328 may utilize HTML 5, CSS, JavaScript, and/or Java, for example, which are languages and technologies that can be used to provide such functionality. The data created is preferably platform agnostic (i.e. usable in any way by systems that can access it). According to one embodiment, the foregoing languages are used; however, those skilled in the art will appreciate that other programming languages and technologies can also be used to provide the functionalities described herein.

Once the incoming files have been received, they can be analyzed by the data loader module 332 in the application layer 330. The data loader module 332 stores the document definitions for each file type. The data loader module 332 utilizes the stored definitions to extract the relevant data from each incoming document. The data loader module 332 also includes code to automatically identify matching data elements or data fields by searching for matches between the data elements and data fields extracted from the incoming file, and data elements and data fields previously stored in the database 122, as described above. The data loader module 332 writes the extracted data elements and/or data fields to the database 122 in the data storage layer 340. The data loader module 332 also stores any newly discovered correlations between incoming data or data fields and previously stored data or data fields.

The computer implemented system and method described herein can provide the advantages of significantly enhancing the efficiency with which an organization can extract useful information from a variety of data sources, store such extracted data in a database, and correlate such extracted data with existing information on its customers, clients or students, thereby allowing the organization to efficiently create reports that provide a comprehensive description of the customer, client, student, or other member. Although the foregoing discussion has focused primarily on an educational institution assembling relevant data, processing the data, and generating reports containing the relevant data for an instructor for the benefit of a student, the system may be operated and maintained by other types of organizations or entities who may configure the system to provide similar advantages to their customers or clients. In additional, while the foregoing description has focused primarily on a personal finance management course for a student, the principles of the invention can be applied to other environments where the operating entity can assemble and provide relevant, timely information to its customers or clients.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

The mobile device 160 depicted in FIG. 1 may comprise a smart phone, such as an Apple iPhone, Samsung Galaxy, or Amazon Fire Phone, or a tablet computer, such as an Apple iPad or Samsung Galaxy Tab, that includes a touch screen or other interactive display. The mobile device 160 preferably includes hardware and software to enable communication with a cellular network, a WiFi network, and a Bluetooth channel. The personal computing devices 128, 140, 150 may comprise a laptop computer or desktop computer, for example.

Data and information maintained by the servers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network 110 in FIG. 1 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication network 110 may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of a mobile device 160 and personal computing devices 128, 140, 150 are shown in FIG. 1, exemplary embodiments of the invention may utilize other types of communication devices whereby a user may interact with a network that transmits and delivers data and information used by the various systems and methods described herein. The mobile device and personal computing device may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The mobile device 160 and personal computing devices 128, 140, 150 may include various connections such as a cell phone connection, WiFi connection, Bluetooth connection, satellite network connection, and/or near field communication (NFC) connection, for example.

As described above, FIG. 1 includes a number of servers 120, 124, 130 and user communication devices 128, 140, 150, 160, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the mobile device 160 or personal computing devices 128, 140, 150. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information.

Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented system for automatically utilizing data from a document, the system comprising:
    a database; and
    a computer processor that is programmed to:
        receive a document in electronic format;
        automatically scan the document to identify a document definition comprising at least one data field in the document, wherein the at least one data field includes at least one data element, a document type, and a file extension;
        automatically search an existing database for matching document types;
        compare the at least one data field with the a plurality of data fields associated with the matching document types and update the document definition;
        propose the updated document definition to a user through a user interface;
        receive an acceptance or modification of the document type from the user through the user interface;
        receive an acceptance or modification of at least one of the at least one data field from the user through the user interface;
        automatically extract at least one data element and at least one data field from the document using the document definition;
        update the existing database by storing a link between at least one of the extracted data element or data field and a data element or data field of a matching document type;
        store the at least one extracted data element in the database; and
        generate a report containing at least one extracted data element and at least one existing data element.

2. The computer implemented system of claim 1, wherein, as part of the step of proposing a document definition, the computer processor is further programmed to present to the user an image of a proposed document and a name of the proposed document.

3. The computer implemented system of claim 2, wherein, as part of the step of receiving a modification of the document definition, the computer processor is further programmed to present to the user a graphical user interface that allows the user to modify at least one region on the document corresponding to a data field.

4. The computer implemented system of claim 2, wherein, as part of the step of receiving a modification of the document definition, the computer processor is further programmed to receive from the user a modified file type.

5. The computer implemented system of claim 2, wherein, based on the step of automatically search the existing database, the computer processor is further programmed to present the user with one or more proposed links between a data element or data field extracted from the document and a data element or data field stored in the existing database.

6. The computer implemented system of claim 5, wherein, the computer processor is further programmed to receive from the user an acceptance or rejection of the proposed link.

7. The computer implemented system of claim 1, wherein, the at least one data element comprises a group of non-repetitive data extracted from a larger group of data.

8. The computer implemented system of claim 1, wherein, the received document is simultaneously displayed to the user in conjunction with the proposed document definition.

9. The computer implemented system of claim 1, wherein, the computer processor is further programmed to learn from modification of the document definition for use with future iteration of the computer programming.

10. A computer-implemented method for automatically utilizing data from a document, the method comprising:
    receiving a document in electronic format;
    automatically scanning the document to identify a document definition comprising at least one data field in the document, wherein the at least one data field includes at least one data element, a document type, and a file extension;
    automatically searching an existing database for matching document types;
    comparing the at least one data field with the a plurality of data fields associated with the matching document types and update the document definition;
    proposing the updated document definition to a user through a user interface;
        receiving an acceptance or modification of the document type from the user through the user interface;
        receiving an acceptance or modification of at least one of the at least one data field from the user through the user interface;
    automatically extracting at least one data element and at least one data field from the document using the document definition;
    updating the existing database by storing a link between at least one of the extracted data element or data field and a data element or data field of a matching document type;
    storing the at least one extracted data element in the database; and
    generating a report containing at least one extracted data element and at least one existing data element.

11. The computer implemented method of claim 10, wherein, as part of the step of proposing a document definition, the method further comprises presenting to the user an image of a proposed document and a name of the proposed document.

12. The computer implemented method of claim 11, wherein, as part of the step of receiving a modification of the document definition, the method further comprises presenting to the user a graphical user interface that allows the user to modify at least one region on the document corresponding to a data field.

13. The computer implemented method of claim 11, wherein, as part of the step of receiving a modification of the document definition, the method further comprises receiving from the user a modified file type.

14. The computer implemented method of claim 11, wherein, based on the step of automatically search the existing database, the method further comprises presenting the user with one or more proposed links between a data element or data field extracted from the document and a data element or data field stored in the existing database.

15. The computer implemented method of claim 14, further comprising receiving from the user an acceptance or rejection of the proposed link.

16. The computer implemented method of claim 14, wherein, the at least one data element comprises a group of non-repetitive data extracted from a larger group of data.

17. The computer implemented method of claim 14, wherein, the received document is simultaneously displayed to the user in conjunction with the proposed document definition.

18. The computer implemented method of claim 14, wherein, the method further comprises learning from modification of the document definition for use with future iteration of the computer programming.

* * * * *